United States Patent [19]

Coker et al.

[11] Patent Number: 5,220,466
[45] Date of Patent: Jun. 15, 1993

[54] METHOD AND APPARATUS FOR DIGITAL FILTER CONTROL IN A PARTIAL-RESPONSE MAXIMUM-LIKELIHOOD DISK DRIVE SYSTEM

[75] Inventors: Jonathan D. Coker, Rochester, Minn.; Francois B. Dolivo, Waedenswil, Switzerland; Richard L. Galbraith, Rochester, Minn.; Wolfgang H. Schott, Rueschlikon, Switzerland; Pablo A. Ziperovich, San Jose, Calif.

[73] Assignee: International Business Machines Corporation, Armonk, N.Y.

[21] Appl. No.: 703,520

[22] Filed: May 21, 1991

[51] Int. Cl.⁵ .................................................. G11B 5/09
[52] U.S. Cl. ........................................ 360/46; 360/39; 360/51
[58] Field of Search ..................... 360/39, 46, 57, 53

[56] References Cited

U.S. PATENT DOCUMENTS

| | | | |
|---|---|---|---|
| 4,750,058 | 6/1988 | Hirt et al. | 360/46 |
| 4,786,890 | 11/1988 | Marcus et al. | 341/81 |
| 4,885,757 | 12/1989 | Provence | 375/96 |
| 4,888,775 | 12/1989 | Karabed et al. | 571/43 |
| 4,888,779 | 12/1989 | Karabed et al. | 371/43 |
| 4,929,918 | 5/1990 | Chung et al. | 331/1 A X |
| 4,945,538 | 7/1990 | Patel | 371/43 |
| 4,964,107 | 10/1990 | Galbraith et al. | 363/120 |
| 4,970,609 | 11/1990 | Cunningham et al. | 360/51 |
| 5,121,263 | 6/1992 | Kerwin et al. | 360/53 |
| 5,157,354 | 10/1992 | Saiki et al. | 360/51 X |

Primary Examiner—David Mis
Attorney, Agent, or Firm—Joan Pennington; Richard E. Billion; Bradley A. Forrest

[57] ABSTRACT

A method and apparatus are provided for controlling a digital filter function included in a data path within gain and timing control loops of a PRML magnetic recording channel. The digital filter function is removed from the data path during an acquisition mode and the digital filter function is restored to the data path during a tracking mode. A predetermined gain and a quantized delay at a synchronization frequency are provided when switching from acquisition mode to tracking mode. A unity gain and a delay of an integer number of sample periods are provided at a synchronization frequency when switching from acquisition mode to tracking mode.

12 Claims, 6 Drawing Sheets

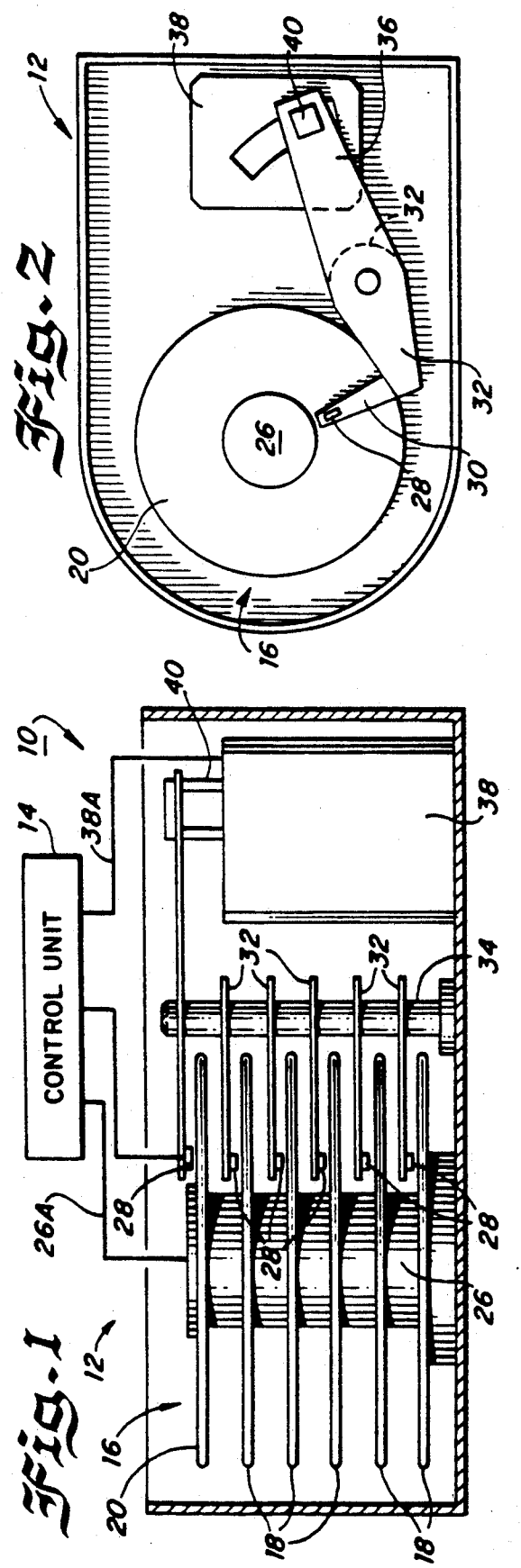

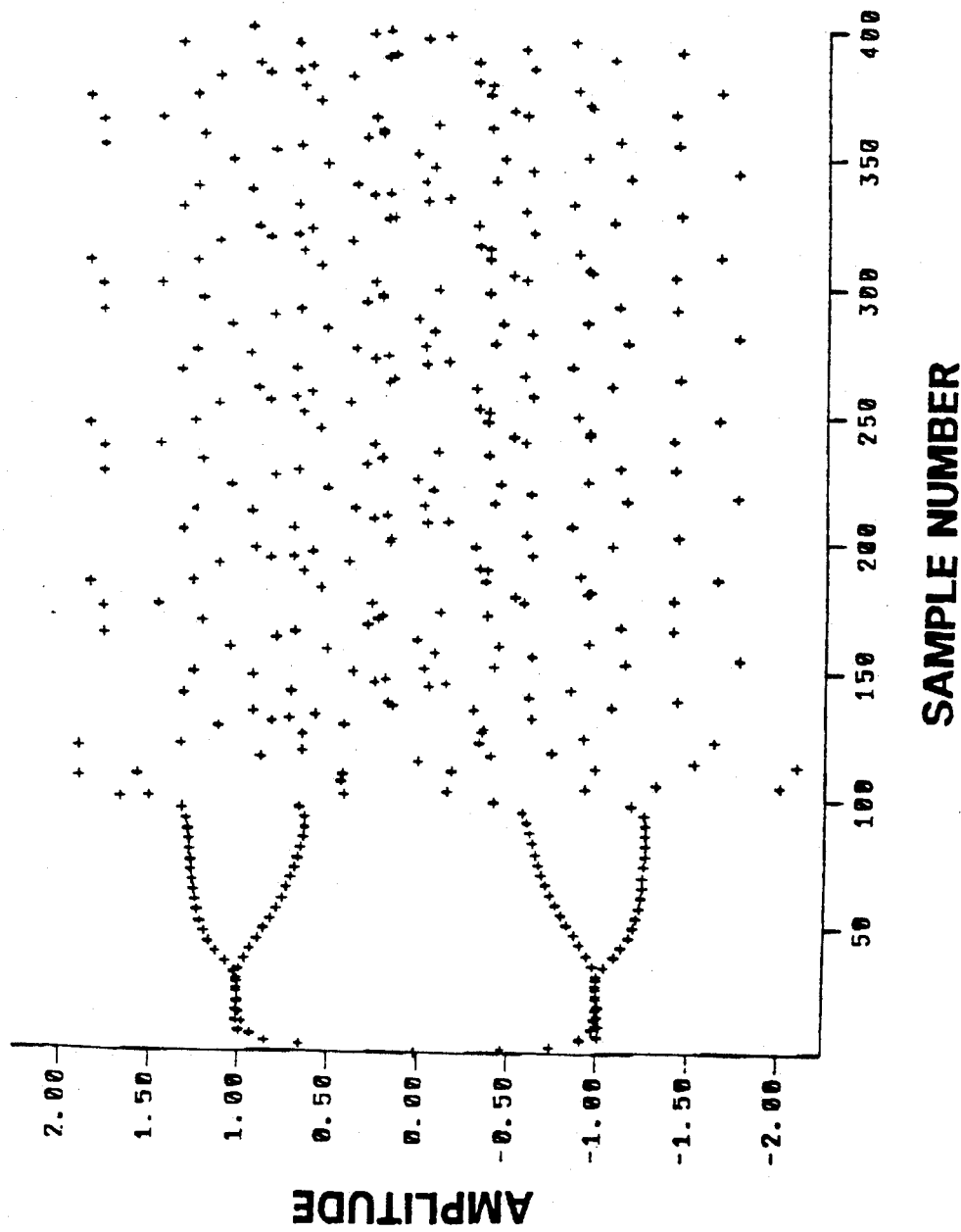

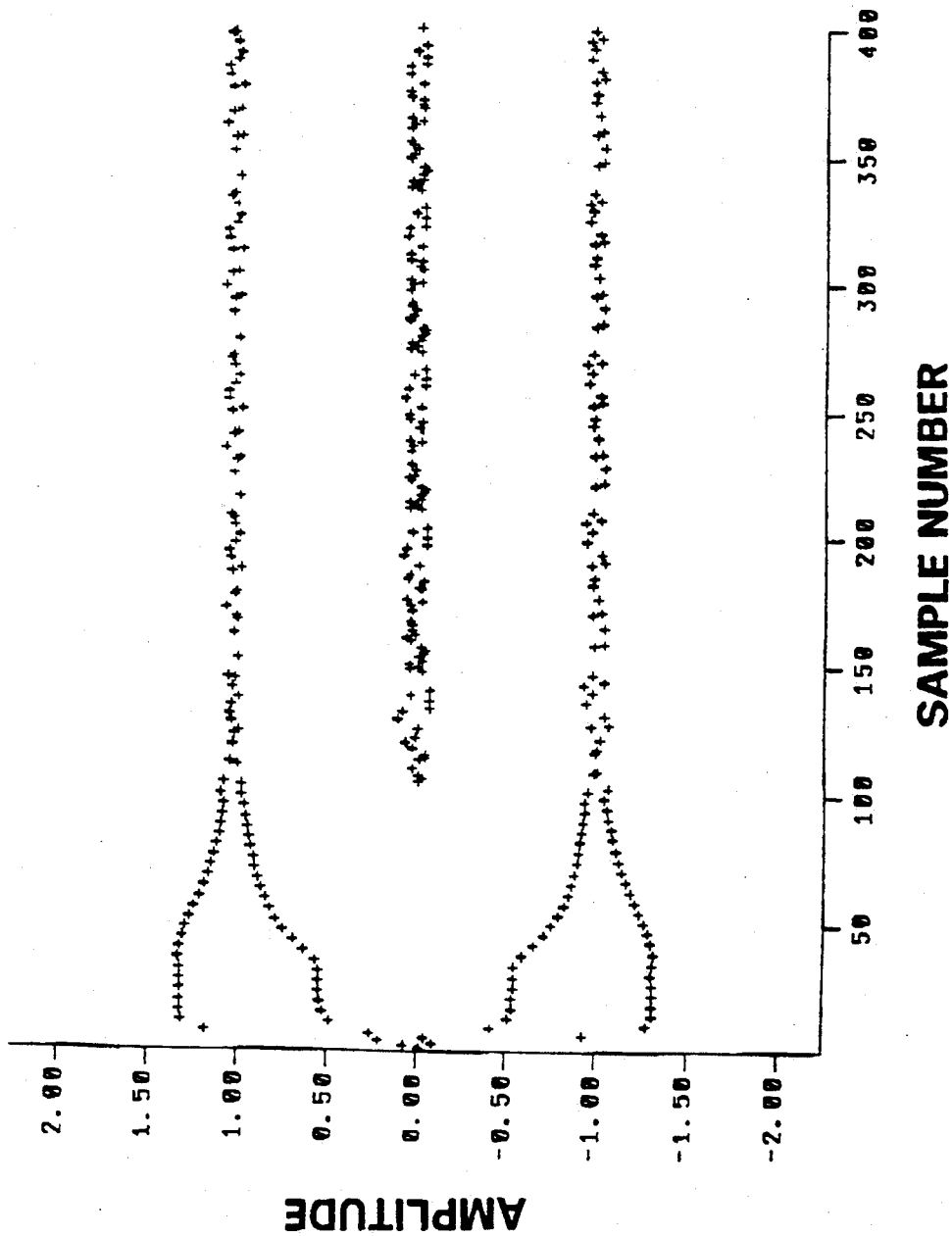
Fig. 4B FILTERED

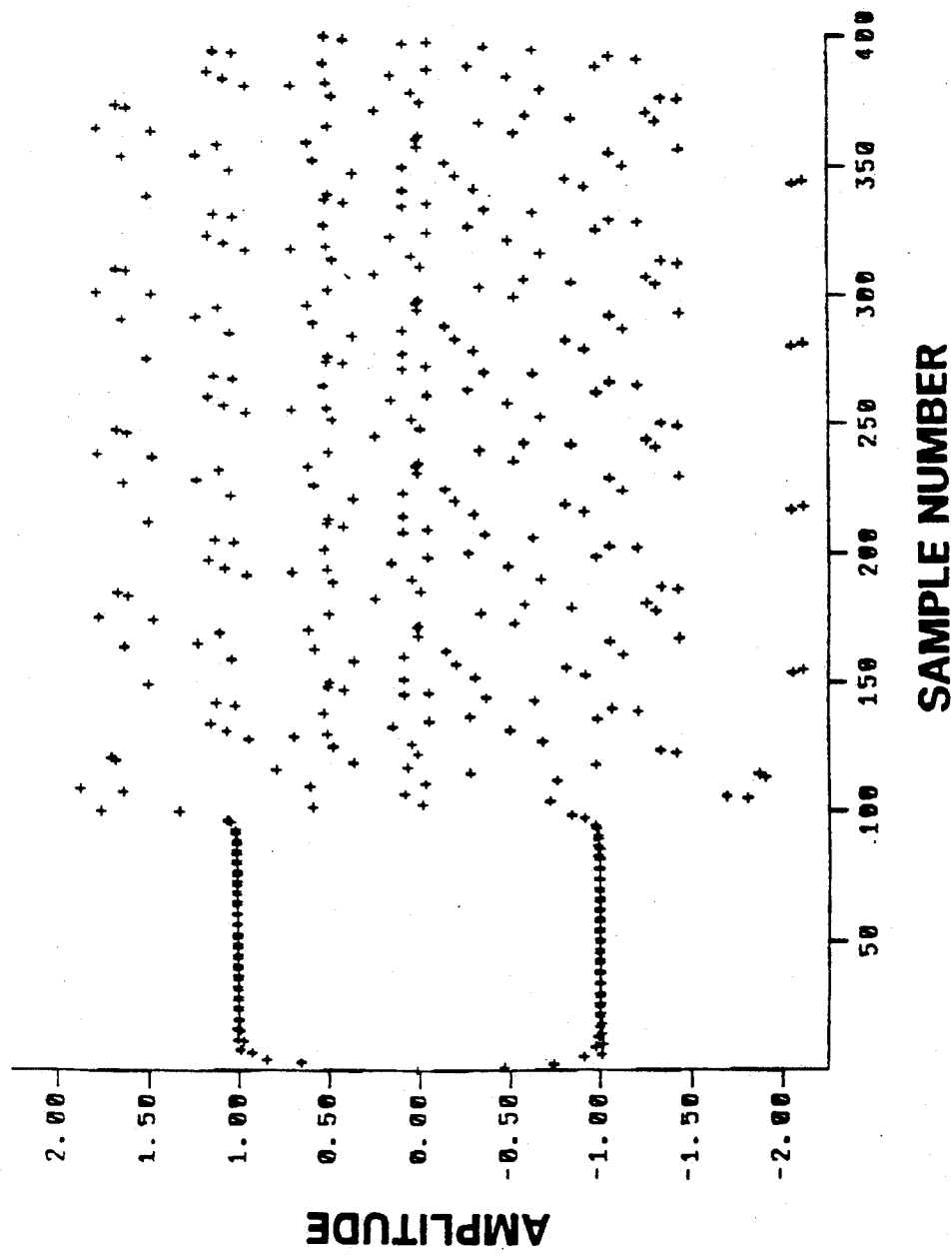

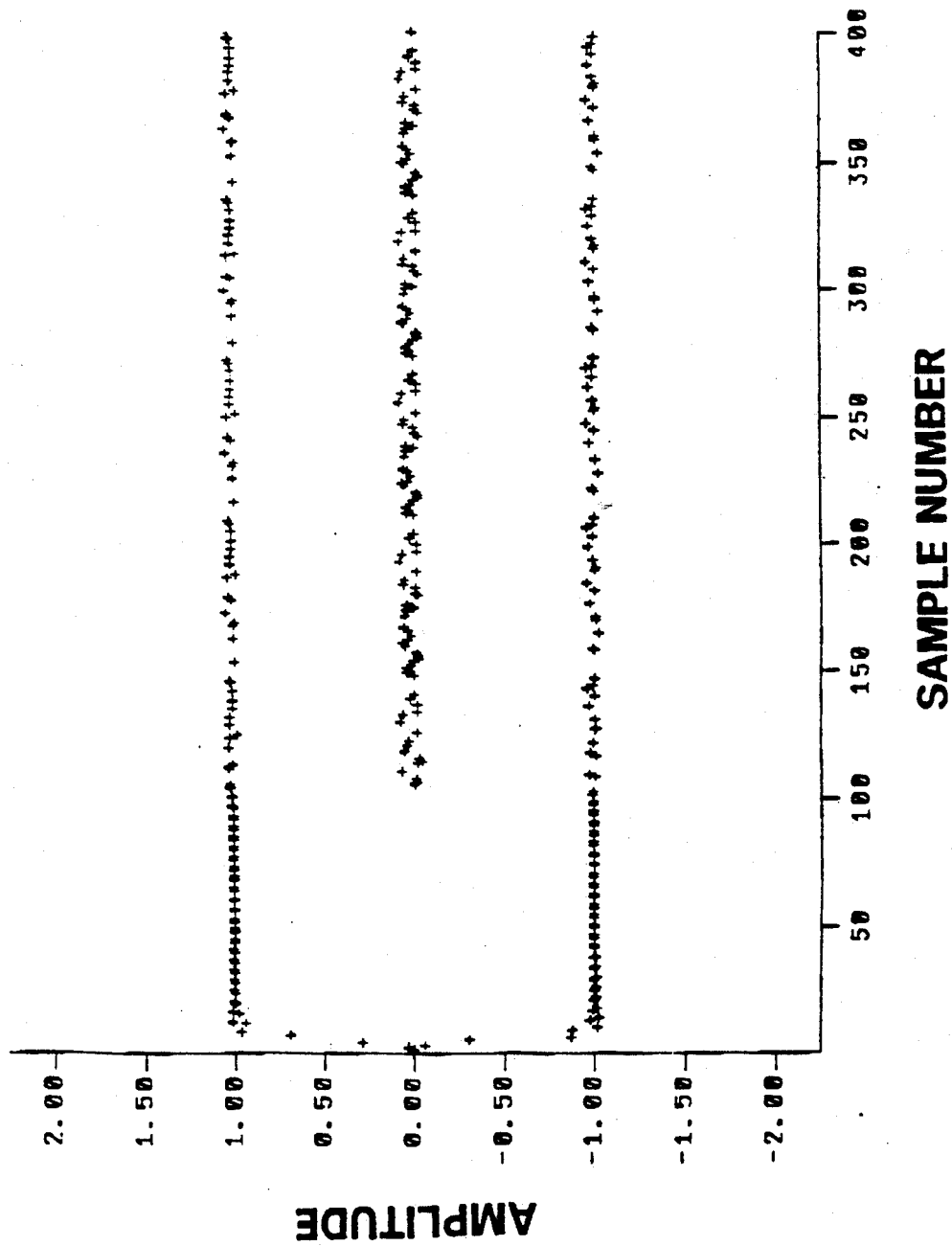

METHOD AND APPARATUS FOR DIGITAL FILTER CONTROL IN A PARTIAL-RESPONSE MAXIMUM-LIKELIHOOD DISK DRIVE SYSTEM

BACKGROUND OF THE INVENTION

1. Field of the Invention

The present invention relates generally to a direct access storage device (DASD) of the type utilizing partial-response signaling and maximum-likelihood (PRML) detection together with digital filtering, and more particularly to a method and apparatus for controlling a digital filter function in a PRML magnetic recording channel.

2. Description of the Prior Art

Computers often include auxiliary memory storage units having media on which data can be written and from which data can be read for later use. Disk drive units incorporating stacked, commonly rotated rigid magnetic disks are used for storage of data in magnetic form on the disk surfaces. Data is recorded in concentric, radially spaced data information tracks arrayed on the surfaces of the disks. Transducer heads driven in a path toward and away from the drive axis write data to the disks and read data from the disks. Achievement of high data density and high data rates has resulted in the use of a PRML channel for writing and reading digital data on the disks as an alternative to the more usual peak detecting techniques.

Partial-response signaling with maximum-likelihood sequence detection techniques are known for digital data communication and recording applications. U.S. Pat. Nos. 4,786,890, 4,888,775 and 4,888,779 describe trellis and run length limited (RLL) coding techniques for transmission of digital data over PRML channels.

U.S. Pat. Nos. 4,750,058, 4,964,107, 4,970,609 and 4,945,538 describe magnetic disk drives using PRML channels. No specific details on digital filter control are disclosed in the above-listed patents.

To obtain full advantage of PRML, the received signal or the read signal must be passed through a specially designed equalizing filter which produces at its output a signal spectrum corresponding to the wave shape for which the maximum-likelihood detector is designed. When using digital filtering in a PRML system, the filter is located between an analog-to-digital converter (ADC) and other signal processing hardware which controls the system and performs the detection.

U.S. Pat. No. 4,885,757 discloses a digital maximum-likelihood sequence estimator receiver including a matched filter connected to a digital transmission channel and a sampler for providing sampled signals output by the matched filter. The sampled signals are input to an analog neural network to provide high-speed outputs representative of the transmission channel signals. The neural network outputs are provided as inputs to a coefficient estimator which produces coefficients for feedback to the matched filter. For time-varying transmission channel characteristics, the coefficient estimator provides a second coefficient output which is utilized for changing the interconnection strengths of the neural network connection matrix to offset the varying transmission channel characteristics. Disadvantages of the above-described arrangement include both the complexity of the hardware and time required for adaptively controlling the matched filter.

SUMMARY OF THE INVENTION

A principal object of the present invention is to provide an improved apparatus and method for controlling a digital filter function in a PRML magnetic recording channel in a direct access data storage system. Other objects are to provide such improved digital filter function substantially without negative effects and that overcome many of the disadvantages of prior art arrangements.

In brief, the objects and advantages of the present invention are achieved by a method and apparatus for controlling a digital filter function included in a data path within gain and timing control loops of a PRML recording channel. The digital filter function is removed from the data path during an acquisition mode and the digital filter function is restored to the data path during a tracking mode. A predetermined gain and a quantized delay at a synchronization frequency are provided when switching from acquisition mode to tracking mode.

In accordance with the invention, a unity gain and a delay of an integer number of sample periods are provided at a synchronization frequency when switching from acquisition mode to tracking mode

BRIEF DESCRIPTION OF THE DRAWINGS

The present invention together with the above and other objects and advantages may best be understood from the following detailed description of the embodiment of the invention illustrated in the drawings, wherein:

FIG. 1 is a schematic and block diagram of a data storage disk file embodying the present invention;

FIG. 2 is a diagram showing the accessing mechanism for a single disk surface of the apparatus of FIG. 1;

FIGS. 4A, 4B, 5A and 5B are charts showing PRML digital filter simulation of a sector of data before and after a digital filter to illustrate operation of the present invention.

DETAILED DESCRIPTION OF THE PREFERRED EMBODIMENTS

Figure 3:
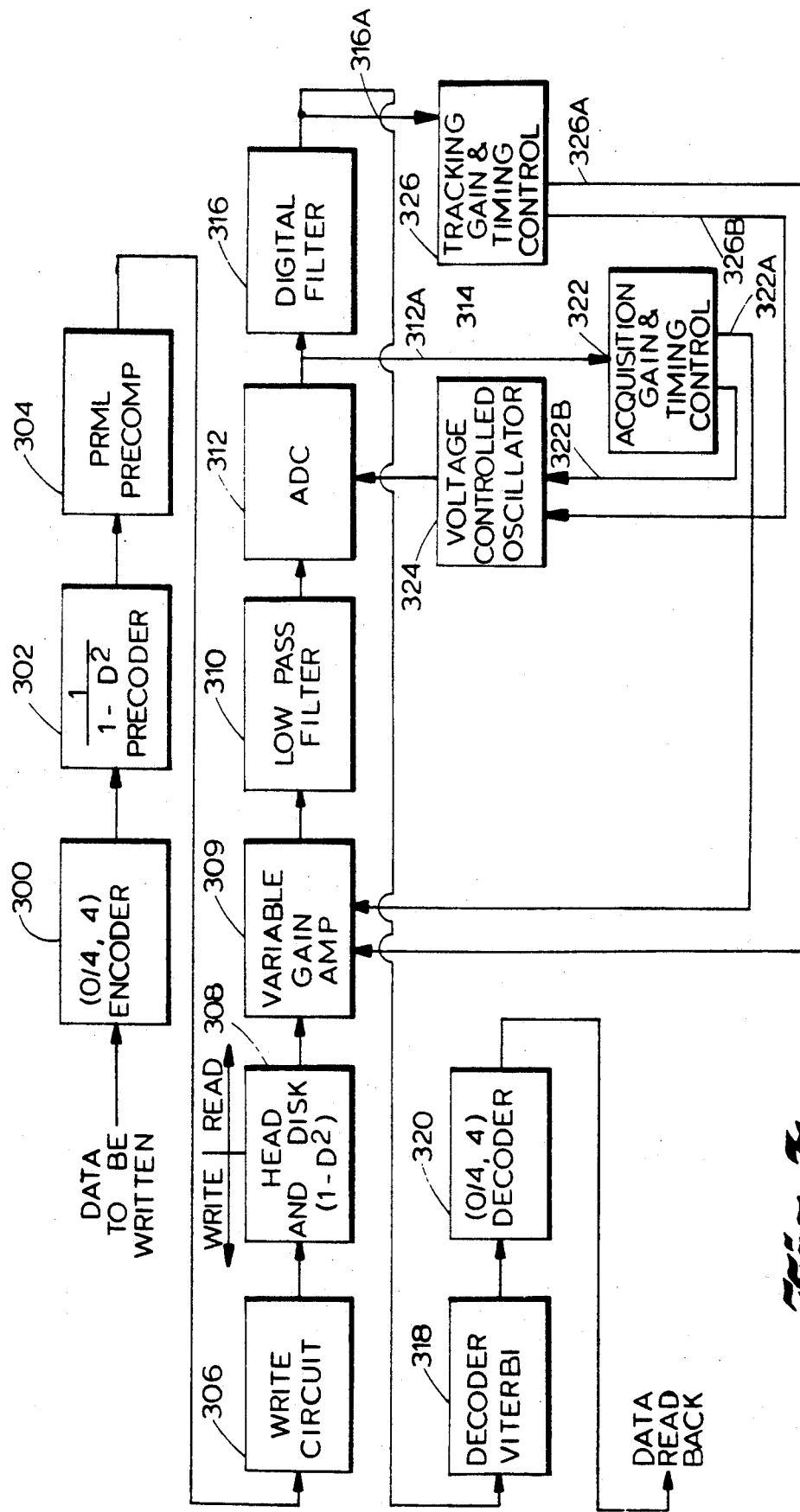
FIG. 3 is a diagram illustrating apparatus for carrying out the digital filter control according to a method of the present invention in the data storage disk file of FIG. 1.

In FIG. 1 there is shown a partly schematic block diagram of parts of a data storage disk file 10 including a data storage medium generally designated as 12 and a control unit generally designated as 14. In the preferred embodiment of this invention, the data storage medium 12 is embodied in a rigid magnetic disk drive unit 12, although other memory configurations may be used. Unit 12 is illustrated in simplified form sufficient for an understanding of the present invention because the utility of the present invention is not limited to the details of a particular drive unit construction.

Referring now to FIGS. 1 and 2 of the drawings, disk drive unit 12 includes a stack 16 of disks 18 having at least one magnetic surface 20. The disks 18 are mounted in parallel for simultaneous rotation on and by an integrated spindle and motor assembly 26. Data information on each disk 18 are read and/or written to by a corresponding transducer head 28 movable across the disk surface 20.

Transducer heads 28 are mounted on flexure springs 30 carried by arms 32 ganged together for simultaneous pivotal movement about a support spindle 34. One of the arms 32 includes an extension 36 driven in a pivotal motion by a head drive motor 38. Although several drive arrangements are commonly used, the motor 38 can include a voice coil motor 40 cooperating with a magnet and core assembly (not seen) operatively controlled for moving the transducer heads 28 in synchronism in a radial direction in order to position the heads in registration with data cylinders to be followed. The VCM is movable within a fixed magnetic field, and the direction and velocity of the coil movement is controlled by the current supplied. During operation of the disk file 10, the various components of the disk file 10 are controlled in operation by signals generated by control unit 34 such as motor control signals on line 26A and position control signals on line 38A.

Referring now to FIG. 3, there is shown a block diagram of a partial-response maximum-likelihood (PRML) recording channel available in the disk file 10 for carrying out the digital filter control method of the invention. Data to be written is applied to an encoder 300 for providing a modulation coded output having predefined run length constraints, such as for the minimum and maximum number of consecutive zeros and the maximum run length of zeros in the even and odd recorded sequences in the overall recorded sequence. A precoder 302 follows the encoder 300 described by a $1/(1-D^2)$ operation where D is a unit delay operator. A PRML precomp 304 coupled to the precoder 302 provides a modulated binary pulse signal applied to a write circuit 306 that provides the modulated write current for writing to the disk surface. An analog read signal is obtained at head and disk block 308 described by the $(1-D^2)$ operation. The read signal is applied to a variable gain amplifier (VGA) 309 and the amplified read signal is applied to a lowpass filter 310 which may or may not provide equalization for class IV response. The filtered read signal is converted to digital form by an analog to digital converter (ADC) 312 that provides 64 possible 6-bit sampled values. Gain and timing control circuitry are generally designated by the reference character 314. Typically the 6-bit samples of the ADC 312 are applied to a digital filter 316, such as a 10 tap finite impulse response (FIR) digital filter. The filtered signal from the digital filter 316 is applied to a Viterbi decoder 318 coupled to a decoder 320 to complete the maximum-likelihood (ML) detection process for data read back.

Gain and timing control functions involve an acquisition mode of operation and a tracking mode of operation. During the acquisition mode, the gain and timing control circuitry 314 locks onto a predetermined data pattern called the sync field setting the VGA amplitude to a determined voltage level and setting the ADC sampling phase to achieve proper lock-on to the sync field. After the loops have converged during the tracking mode, the gain and timing control circuitry 314 tracks customer data making sure the signal remains locked.

Gain and timing control circuitry includes an acquisition gain and timing control 322 having digital signals supplied by the ADC 312 at lines 312A. During the acquisition mode of operation, acquisition gain and timing control 322 generates a digital gain control signal on lines 322A for adjusting the gain of the VGA 309 and generates a digital timing control signal on lines 322B for correcting timing applied to a voltage controlled oscillator (VCO) 324. Digital signals on lines 316A are supplied by the digital filter 316 to a tracking gain and timing control 326. Tracking gain and timing control 326 generates a digital gain control signal on lines 326A for adjusting the gain of the VGA 309 and generates a digital timing control signal 326B for correcting timing applied to a voltage controlled oscillator (VCO) 324 during the tracking mode of operation.

In accordance with the invention, the digital filter function 316 included inside the timing and gain loops is removed during acquisition, and then restored when the tracking loops are enabled. To avoid any problems with start-up of the digital filter 316, such as, initial conditions, data is circulated through the filter during the acquisition mode, even though it is not used in the data path.

By leaving the digital filter 316 out of the data path during the acquisition mode and then including it when tracking, an instantaneous timing and gain discontinuity is likely to occur when switching modes. This problem is solved by the invention by requiring the filter to have unity gain and quantized delay at the synchronization frequency. The predefined quantized delay is defined by $nT \pm k$ for digital filters, where T is the sampling period, n is an integer number of delays, and k is the fractional amount of delay. For PRML systems, the parameter k takes values in $\frac{1}{4}$ T steps. Alternative values of the parameter k can be used depending on the locking sampling phase during the acquisition mode.

During the acquisition mode, the digital filter is not in the data path but is active resolving initial conditions. As a result, the convergence time of both the timing and gain loops is not affected by the presence of the digital filter.

After the acquisition mode is complete and the tracking loops of the tracking gain and timing control 326 are activated, the data circulates through the digital filter 316. The timing and gain loops are not affected by the change in data path due to the unity gain and the fractional delay of the filter at the synchronization frequency.

FIG. 4A shows a simulation of a sector of data before the digital filter 316 and FIG. 4B shows a simulation of a sector of data after the digital filter 316. As shown, the delay through the filter at the synchronization frequency is 5.25T, not an integer number of sample periods and the gain is 1.5 or higher than unity. During acquisition both gain and timing loops lock to the unfiltered data stream. The transition from acquisition to tracking takes place at bit 30. At this point the gain and timing loops start using filtered data from the output of the digital filter 316 supplied to the tracking gain and timing control 326. As shown in FIG. 4B, an instantaneous gain and timing discontinuity results due to switching modes with gain of 1.5 and delay of 5.25T. The gain and timing loops now resynchronize to the data using the slow low gain tracking mode. Such longer synchronization time and the possibility of no synchronization cannot be tolerated in the DASD environment.

FIGS. 5A and 5B illustrate control according to the invention, where the delay through the filter at the synchronization frequency is 5T, an integer number of sample periods and the gain is unity. FIG. 5A also shows a simulation of a sector of data before the digital filter operation and FIG. 5B shows a simulation of a sector of data after the digital filter 316. In FIGS. 5A and 5B, loop discontinuity is avoided and the data is locked, properly sampled, and equalized.

While the invention has been described with reference to details of the illustrated embodiments, these details are not intended to limit the scope of the invention as defined in the appended claims.

We claim:

1. A method for controlling a digital filter function included in a data path within gain and timing control loops of a PRML recording channel comprising the steps of:

removing the digital filter function from the data path during an acquisition mode;

restoring the digital filter function to the data path during a tracking mode; and providing a predetermined gain and a quantized delay at a synchronization frequency when switching from acquisition mode to tracking mode.

2. A method as recited in claim 1 further comprising the step of:

supplying a digital signal from an analog to digital converter ADC of the PRML magnetic recording channel to an acquisition gain and timing control during the acquisition mode.

3. A method as recited in claim 2 further comprising the steps of:

supplying a digital signal from the ADC of the PRML recording channel to the digital filter during the acquisition mode, whereby initial conditions start-up of the digital filter is provided with the digital filter function removed from the data path.

4. A method as recited in claim 1 further comprising the step of:

supplying a digital signal from the digital filter of the PRML recording channel to a tracking gain and timing control during the tracking mode.

5. A method as recited in claim 3 wherein said step of providing a predetermined gain includes providing a unity gain.

6. A method as recited in claim 1 wherein said step of providing a quantized delay includes providing a delay defined by $nT \pm k$, where n is an integer number, T is a sampling period and k is a fractional delay parameter.

7. Apparatus for controlling a digital filter function included in a data path within gain and timing control loops of a PRML recording channel comprising:

means for removing the digital filter function from the data path during an acquisition mode;

means for restoring the digital filter function to the data path during a tracking mode; and means for providing a predetermined gain and a quantized delay at a synchronization frequency when switching from acquisition mode to tracking mode.

8. Apparatus as recited in claim 7 wherein said PRML recording channel is a PRML magnetic recording channel including a maximum-likelihood detector; a variable-gain amplifier (VGA); an analog to digital converter (ADC); and the digital filter function being coupled between the ADC and the maximum-likelihood detector; and wherein said means for removing the digital filter function from the data path during an acquisition mode include:

an acquisition gain and timing control for receiving an input signal from the ADC; and said acquisition gain and timing control responsive to said received input signal for generating a digital gain control signal for adjusting the gain of the VGA and for generating a digital timing control signal for correcting timing of the ADC.

9. Apparatus as recited in claim 8 wherein said means for restoring the digital filter function from the data path during a tracking mode include:

a tracking gain and timing control for receiving an input signal from the digital filter; and said tracking gain and timing control responsive to said received input signal for generating a digital gain control signal for adjusting the gain of the VGA and for generating a digital timing control signal for correcting timing of the ADC.

10. Apparatus as recited in claim 9 wherein each said acquisition gain and timing control is adapted for providing a unity gain for the VGA and for providing a delay defined by an integer number of sampling periods at a synchronization frequency when switching from acquisition mode to tracking mode.

11. Apparatus as recited in claim 7 further including means for supplying a digital signal from an analog to digital converter of the PRML recording channel to the digital filter during an acquisition mode, whereby initial conditions start-up of the digital filter is provided with the digital filter function removed from the data path.

12. In a direct access storage device (DASD) of the type utilizing partial response signaling and maximum-likelihood (PRML) detection including a digital filtering function comprising:

a housing;

at least one disk mounted in said housing for rotation about an axis and for providing at least one disk surface for storing data arrayed in a pattern around said axis;

transducer means mounted for movement across said disk surface for reading and writing data on said disk surface; and apparatus for controlling a digital filter function included in a data path within gain and timing control loops of the PRML magnetic recording channel including;

means for removing the digital filter function from the data path during an acquisition mode;

means for restoring the digital filter function to the data path during a tracking mode; and means for providing a predetermined gain and a quantized delay at a synchronization frequency when switching from acquisition mode to tracking mode.

* * * * *